Figure 1:
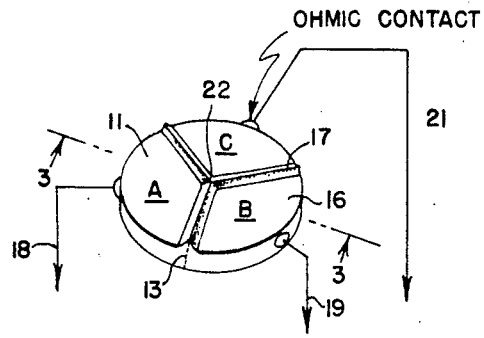

INVENTOR.
ROLF K. MUELLER

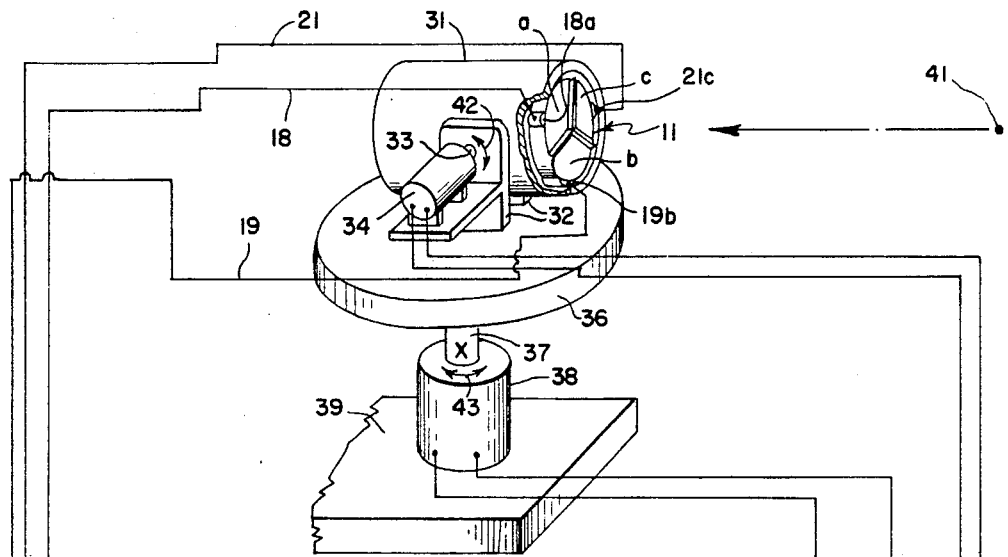

United States Patent Office 3,293,440
Patented Dec. 20, 1966

3,293,440
GRAIN BOUNDARY PHOTO-ORIENTER WITH
INTEGRAL SHIELDS
Rolf K. Mueller, Bloomfield Hills, Mich., assignor to
Litton Systems, Inc., Beverly Hills, Calif.
Filed Nov. 21, 1963, Ser. No. 325,405
8 Claims. (Cl. 250—211)

This invention relates generally to a photosensitive device and more particularly to a direction indicator utilizing a semiconductive cell having a plurality of intersecting grain boundaries located in a contoured surface.

The utilization of semiconductive material having a grain boundary for single dimension discrimination is not new, as it is well known that the transversal photovoltage changes as a light spot crosses a grain boundary. See, for instance, the article written by G. L. Pearson appearing in the Physical Review, volume 76, page 459, 1949 and U.S. Patent 2,740,901 issued to Robert E. Graham on April 3, 1956. However, the usefulness of a semiconductive device for discrimination and more specifically for tracking a radiation source in only one dimension, is rather limited.

Further, the usual tracking or radiation source detecting device utilizes a rather complicated optical system in order to determine the direction of the radiation source with respect to the surface of a detector cell. For instance, the light source may be casting light of the detector but the angle of incidence of the beam to the surface of the detector cell may be something other than 90° angle. Consequently, the usual direction sensing device utilizes a lens or prism system in order to locate the light or radiation source in order to provide a means for positioning the receiving surface of the detector cell perpendicular to the impinging radiation.

Accordingly, it is one object of the present invention to provide a new and improved photosensitive device and direction indicator.

It is a further object of the present invention to provide a new and improved direction indicator utilizing a grain boundary in a photosensitive semiconductor which device enables the indicator to discriminate in two dimensions or along two axes.

It is another object of the present invention to provide a new and improved apparatus for indicating the direction of a light source and for orienting a detector cell to place a photosensitive surface at an angle perpendicular to the incident light beam.

It is an object of the present invention to provide a new and improved semiconductor cell for radiation direction discrimination.

It is a further object of the present invention to provide a new and improved photosensitive semiconductor cell having grain boundaries located in a contoured surface of the semiconductor cell.

It is a further object of the present invention to provide a new and improved photosensitive semiconductor cell having intersecting grain boundaries positioned along intersecting ridges formed in one surface of the semiconductor cell.

It is another object of the invention to provide a photosensitive cell having intersecting grain boundaries located along shields at one surface of the cell.

It is a further object of the invention to provide a new and improved radiation source direction indicator utilizing a semiconductor cell having a grain boundary, provided with shielding arrangements associated with the boundary to produce a direction discrimination function.

The present invention, in one aspect, contemplates a position indicator which utilizes a cell of semiconductive material containing intersecting grain boundaries. In one embodiment, these grain boundaries are located in ridges formed in one surface of the cell to provide not only a radiation sensing function but also a radiation direction discriminating function. Another broad aspect or feature of the invention involves the use of shielding arrangements, such as the ridges, along a grain boundary to give this desired directivety. The cell generates an electrical signal indicative of the light source location or direction. This signal is utilized in a servo system to orient the cell so that the beam of radiation is perpendicular to the radiation sensitive surface of the semiconductor cell.

Figure 3:
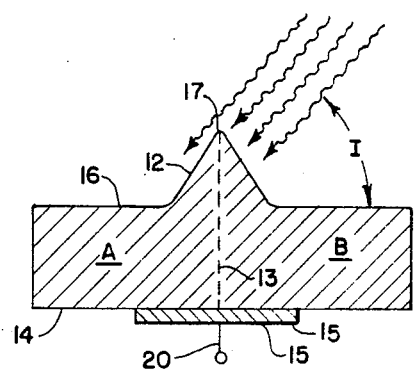
Figure 2:
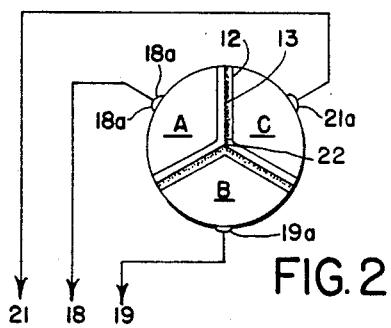
Figure 4:
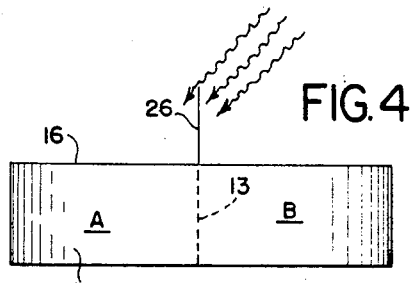
Figure 6:
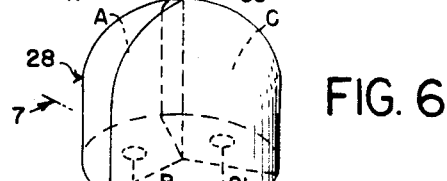
Figure 5:
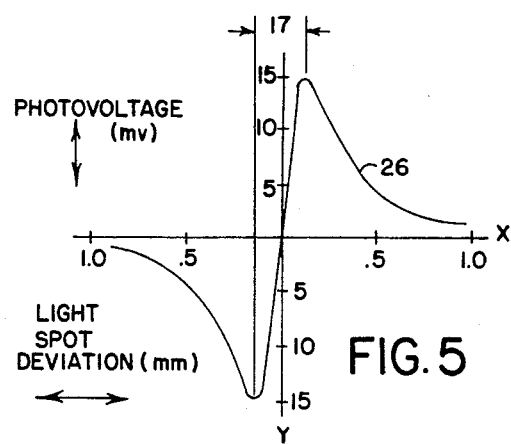
Figure 7:
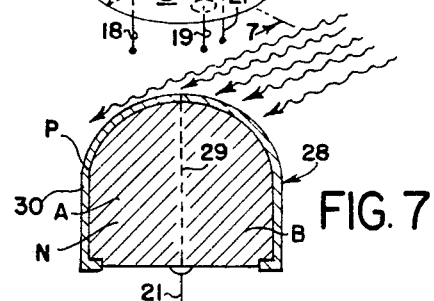

Other objects and advantages of the invention will become apparent upon consideration of the specification and the drawings in which:

FIGURE 1 is an isometric view of a semiconductor cell according to the invention, FIGURE 2 is a top view of the cell in FIGURE 1 and shows the electrical connections to the cell, FIGURE 3 is a cross section of the cell in FIGURE 1 taken along lines 3—3 and showing the grain boundary, FIGURE 4 is an alternate embodiment of the invention, FIGURE 5 is a graph showing the photo response to a spot of light imaged on a cell as the light spot traverses the boundary region, FIGURE 6 is an isometric view of an alternate embodiment of the invention in which the semiconductor cell is dome shaped, FIGURE 7 is a cross section view of the cell shown in FIGURE 6, and FIGURE 8 is a schematic diagram showing the photosensitive semiconductor cell of FIGURE 1 utilized in a radiation source position indicator.

Refer first to FIGURE 1 of the drawings where there is shown an isometric view of a cell of semiconductor material generally in the shape of a disc. For the purposes of illustrating the invention, the material composing the cell or body 11 will be assumed to be N-type germanium. However, it is to be noted that any type of semiconductor material such as silicon might be utilized. The cell 11 contains three areas, A, B, and C which are separated by intersecting ridges 12. These intersecting ridges separate the areas A, B, and C which are identical as far as semiconductor material is concerned. In other words, each of the areas A, B, and C is composed of exactly the same N-type geranium.

The segments or areas, A, B and C are also divided by a grain boundary 13 which extends from a bottom surface 14 of the cell 11 to the top 17 of the ridge 12. Consequently, it is noted that ridges 12 and the grain boundaries 13 intersect and follow the same course across the face or top surface 16 of the cell. Surface 16 is a contoured surface. This grain boundary 13 is located in the contoured surface along the apex or top surface 16 of the cell 11. A grain boundary as herein defined is the interface which occurs between two differently oriented single crystal grains for instance, between areas A and B, B and C, etc. of FIGURE 1. In other words, if areas A and B are considered, the monocrystalline structure of area A is oriented at a given angle and the monocrystalline structure of area B is oriented at a different angle from that of A. Since the crystalline structures are not oriented in the same plane or along the same axes, the intersection of the grain structures form a grain boundary 13 wherein the monocrystalline structures of areas A and B do not match or interconnect. The discontinuity thus formed is known as a grain boundary.

Forming a cell 11 with such a grain boundary may be accomplished by several methods. One such method utilized for producing grain boundaries is to control the direction of boundary growth by proper seed orientation. Such a method is noted by B. Chalmers in the Canadian Journal of Physics, 30, 132 (1953). This method is essentially based on the fact that solidification parameters are different for different crystallographic planes and appropriate choice of the planes which each grain exposes to a melt determines the direction of the boundary growth. Another method of growing a tri-crystal cell such as cell 11 may involve growing such a unit in a vertical pulling furnace from three precisely oriented seeds. Such a technique will produce the tri-crystal cell 11 which is effective as a photosensor. In the cells utilized to illustrate this invention, the seeds have been oriented so that three equal areas or single crystals, A, B, and C are produced having the grain boundaries 13 intersect at the center of the cell 11 at 120° angles with respect to each other. Other configurations with a greater number of intersecting grain boundaries might be utilized.

The grain boundaries in the N-type germanium cell 11 provide a barrier to current flow across the boundary but allow a current flow along the boundary. The barrier presented to the flow of current across the grain boundary is caused by negative surface charge which develops at the boundary due to the partial filling of acceptor levels introduced by lattice imperfections at the intersection of the differently oriented monocrystals of the respective areas A, B, and C. The negatively charged boundary is surrounded by a region depleted of free electrons, the so-called space charge region. Thus, it is apparent that the boundary 13 functions somewhat as the P-type region in the usual N-P-N type transistor element.

The cell 11 with the grain boundaries 13 is photosensitive and consequently can be utilized to sense the presence of a radiation or light source. This characteristic of a grain boundary is more fully explained in an article by W. W. Lindeman and R. K. Mueller titled "Grain Boundary Photo Response" which was published October 1960 in the Journal of Applied Physics, volume 31, No. 10, pages 1746 to 1751. It has been found that if light spot impinges on the cell 11 near the grain boundary 13 a photovoltage output will result from the cell 11 which is indicative of the radiation striking the cell 11. The principles of this photovoltaic characteristic are noted by Rolf K. Mueller and R. L. Jacobsen in their article titled "Grain Boundary Photovoltaic Cell" published January 19, 1959 in the Journal of Applied Physics, volume 30, No. 1, pages 121 to 122.

The photovoltaic effect in the cell 11 may be illustrated by the graph shown in FIGURE 5 of the drawings. The Y axes of the graph represents the voltage output. The X axes values represented the distance in millimeters that a light spot is located from the grain boundary which is assumed to be at $X=0$. The positive and negative values indicated the side of the boundary on which the spot falls. It is noted that in the immediate vicinity of the grain boundary 13, the voltage output from the cell 11 changes from a negative value to a positive value. The distance 17 is determined by the light spot diameter. This change indicates that the boundary 13 has been crossed by the beam of radiation or a light spot impinging on the cell 11. This characteristic demonstrated with a light spot may be utilized to indicate which of the areas A, B or C is receiving the greatest amount of radiation even when the light or radiation is not focused as a spot. If area A is receiving the greatest amount of radiation, then the output between areas A and B will be of a given magnitude and polarity in accordance with the graph in FIGURE 5.

It is possible by measuring the voltage output and polarity between the areas A, B, or C to determine the angle of incidence of unfocused radiation or light falling on the cell 11 if a proper physical cell surface is employed. Due to these characteristics of the N-type germanium cell 11 and other semiconductor cells formed according to these teachings, it is possible to use the cell 11 as a photosensitive body for detecting a radiation or light source and the direction thereof.

The cell 11 might be utilized with a servo system by simply connecting the various areas A, B and C to electrodes 18, 19 and 21. These electrodes provide the signal output from the various areas which are indicative of the angle of incidence of the radiation impinging on the cell 11. Any change in the direction or polarity of a voltage indicates an orientation of the cell 11 with respect to the radiation source.

A smooth faced cell 11, however, does not provide a means for locating a radiation source. In other words, radiation might fall on area A at an angle other than perpendicular to the top surface 16 of the cell. The angle of incidence I of the light beam with respect to the surface 16 as noted in FIGURE 3 might be something less than a 90° angle. In order to provide a direction finding function for the cell 11, a contoured surface such as ridge 12 is provided on the top surface 16 of the cell 11 in order to act as a radiation shield. As noted in FIGURE 3 such a ridge 12 shields the light which is striking the cell so that the area A receives a smaller amount of light than area B. With the ridge 12 on the surface of the cell 11, the area A is now partially shielded by the ridge 12 so that the A voltage or signal occurs between A and B. The resultant output across electrodes 18 and 19 can be utilized in an appropriate servo system to orient the cell 11 so that the surface 16 is exactly perpendicular to the impinging light rays 23.

This ridge 12 might be placed on the surface of the cell 11 in several manners. For instance, it might be milled on the cell by simply cutting away the material on either side of the grain boundary 13. The grain boundary 13 must, however, by symmetrically situated at the center of the ridge 12 so that the photovoltaic signals are not influenced by the nonsymmetrical nature of the ridge 12. An effective method of placing the ridge 12 on the surface of the cell 11 is to etch the surface 16 leaving only a ridge 12 symmetrically surrounding the grain boundary 13.

Higher sensitivities can be achieved with the cell shown in FIGURE 3 by making a P-type contact to the grain boundary 13. Substantially the same result can be achieved by diffusing a layer 15 of P-type material to the back 14 of the cell. In either case, the cell is biased in reverse by application of a suitable voltage to lead 20.

Refer to FIGURES 6 and 7 of the drawings for another embodiment of a cell which might be used in a radiation source direction finder. Cell 28 is in the form of a dome or hemisphere with grain boundaries 29 (physically the same as grain boundaries 13) which extend throughout the body of the cell 28 and terminate at the surface of the cell 28. The grain boundaries intersect at 35. The cell 28 has a shell or layer 30 of P-type material diffused into the spherical surface of the body of the cell which is composed of N-type material. In this embodiment, the physical contour of the cell 28 provides a direction finding function by taking advantage of the curve of the cell 29 rather than ridges 12. The result is the same however. If the radiation impinges on cell 28 so that it is not parallel to the line formed by the intersection of the grain boundaries at 35, then the various areas A, B, and C will not be equally energized. This is illustrated in FIGURE 7 of the drawings. The result of this unequal energization is a signal output between the areas A, B and C which are not of equal magnitude. Consequently, this unbalanced condition of the output signals can be utilized in an appropriate servo system to orient the cell 28. The output leads 18, 19, and 21 are connected to the N-type material and are not in contact with the diffused P-type layer 30.

Essentially the same direction finding result might be accomplished by simply mounting a shield 26 on the surface of the cell 11 along the grain boundary 13 to provide the necessary irregular contour for the photosensitive surface 16. Such a configuration is noted in FIGURE 4 of the drawings. The shield 26 would necessarily have to be opaque so that light striking one side of the shield 26 does not penetrate the shield and energize the section of the cell which is to be shielded. In order to attain the sensitivity required for such photocells, the shield 26 also would have to be very thin since a thick shield 26 would effectively cover the grain boundary 13 thus reducing the sensitivity of the cell.

Refer now to FIGURE 8 of the drawings where a system is illustrated for utilizing a photosensitive cell 11 for identifying the direction of a radiation or light source 41. A pair of upright standards 32 pivotally support the cylinder 31 on a shaft 33. The shaft 33 is rotated through the agency of a servo motor 34 carried on a horizontal projection anchored to one of the upright standards 32. The upright standards 32 are in turn carried by a rotatable platform 36. The platform 36 is rotatable about a vertical axes by means of a shaft 37 which is rotated by a second servo motor 38. The servo motor 38 is fixedly disposed on a base 39.

A light source which is to be identified or tracked is denoted by the reference numeral 41 and may be considered as being a star or some similar light source. In the illustrated instance, a photovoltage output of cell 11 is instrumental in causing the cylinder 31 to track the light source 41. The servo motor 34 causes the cylinder 31 to be rotated about a horizontal axes as indicated by the arrow 42. This degree of movement is arbitrarily designated as a Y movement. A servo motor 38 through the medium of a shaft 37 rotates platform 36 about a vertical axes. Such a direction of rotation is indicated by the arrow 43. Here again, quite arbitrarily, this latter movement has been designated as movement in an X direction. Consequently, the servo motor 34 is responsible for tilting the cylinder 31 in elevation whereas the servo motor 38 is responsible for rotating the cylinder 31 in azimuth. Electrical connections are made to the cell 11 by ohmic contacts 18a, 19a and 21a which are in turn connected to leads 18, 19 and 21 respectively. See FIGURE 2 of the drawings. These leads permit the signal output from the various areas A, B and C, of the cell 11 in response to energizing radiation, to be utilized in an appropriate system to orient the cell 11.

Accordingly, the conductors 18, 19 and 21 lead to several difference amplifiers denoted by the reference numerals 44, 46 and 47. Because the amplifiers 44, 46 and 47 are intended to give an output based on the algebraic difference of the two potentials applied to the respective inputs, the inputs for the amplifiers have been indicated by the reference numerals 48, 49, 51, 52, 53, and 54. In this regard the inputs 48 and 49 are associated with the amplifier 44, the inputs 51 and 52 are associated with the amplifier 46 and the inputs 53 and 54 are associated with the amplifier 47. The output of the various amplifiers are assigned the reference numerals 56, 57 and 58 respectively. The amplifiers 44, 46 and 47 may be typical amplifiers designed to amplify difference voltages as they are applied, for instance, to leads 48 and 49. The amplified or algebraic difference of the input voltages is then amplified and result in an output from the amplifier.

It is noted that the several outputs 56 through 58 are connected to a logic unit 59 which amplifies the difference voltage from each of the amplifiers 44, 46 and 47 to a saturation level. The output lines 61 and 62 provide gate signals corresponding to the logic that has been established in the unit 59. The output line of 51 may be considered to carry X intelligence and the line 62 to carry Y intelligence.

Several signal gates 63, 64 and 65 are employed. The lines 61 and 62 lead directly to these signal gates as do the various outputs 56, 57 and 58 from the different amplifiers. The signal gates 63 through 65 are transfer networks that are biased so that X or Y error signals may be transmitted to servo amplifiers 66 and 67. The servo amplifier 66 may be considered as the X amplifier and the servo amplifier 67 as the Y amplifier. The amplifier 66 is connected to the amplifier 67 through an enabling circuit 68 which permits the Y axes amplifier to be active only when the X axes amplifier is in a null condition.

With this circuit the rate of X or Y motion is proportional to the magnitude of the error, whereas direction of motion is dependent upon error signal polarity. Since the goal is to keep the incident radiation from the light source perpendicular to the surface 16 of the cell 11, whenever there is a deviation of the incident radiation from the perpendicular to the surface of the cell, a photovoltage is developed which will have a given polarity. This polarity corresponds with that indicated in the response curve 26 or 29 shown in FIGURE 5 and also the output will have a magnitude dependent upon the variation in the radiation striking the surface 16 and a result of the contour (ridges 12 for example) of the cell.

Assume that the radiation from the source 41 is perpendicular to the surface 16. If the angle of incidence changes and shifts the radiation to one side, then the servo motor 38 will be energized to rotate the platform 36 about the vertical axes provided by the shaft 37. On the other hand, if an elevational direction is required, then the cylindrical member 31 will be tilted either up or down. As has already been indicated, the X correction occurs first and after a null condition has been reached, then the enabling circuit 68 is instrumental in causing the Y correction to take place by activating the amplifier 67. As illustrated in FIGURE 3 of the drawings, this beam of light 23 which is striking the surface 16 other than perpendicularly will produce a shadow, for instance, on section A and will energize section B to a greater extent. Thus there will be a difference in the signal outputs of areas A and B. The ridge 12 insures that a shadow will develop on the section A thus permitting the servo system to orient the cell so that the beam 23 strikes the surface 16 perpendicularly.

X and Y correction will take place when the incidence angle is not correct for the cell 11 due to the fact that the cell contains several intersecting grain boundaries 13 and ridges 12. If only a single ridge 12 were utilized, there would only be a single correction. However, due to the fact that more than one boundary 13 is utilized, in this case, three, a correction takes place in both the X and Y axes and the result is that cell 11 will be oriented so that the beam of light strikes the intersection 12 of the grain boundaries 13 and the light beam will be perpendicular to the cell surface 16 at that intersection 22 or parallel to the line formed by intersection 35 in the case where cell 28 is used.

Many changes might be made by those skilled in the art without deviating from the spirit and scope of the invention. For example, rather than utilizing n-type germanium for the cell 11, a silicon or similar semiconductor material might be utilized. Different methods of shielding the various sections A, B and C might be utilized in order to attain the directional characteristics of the cell 11. Also, more than three intersecting grain boundaries 13 and accompanying ridges 12 might be utilized. For instance, four or five such grain boundaries and ridges might be placed on the surface 16 of the cell 11. Numerous changes might also be made in the servo system illustrated in FIGURE 8. For instance, the null arrangement might be varied so that one or the other of the servo amplifiers 66 and 67 is active while the other is at a null. Conceivably, the mechanisms could be arranged so that both X and Y movement takes place simultaneously. These and many other variations might be made by those skilled in the art without departing from the spirit and the scope of the invention as illustrated by the foregoing specific embodiments.

Now, therefore I claim:

1. A photosensitive semiconductor device, which comprises:
    a semiconductor body of a single semiconductor type and having a substantially planar top surface and a plurality of intersecting grain boundaries which extend from said top surface through said body, said top surface being provided with an integral ridge centered on each of said grain boundaries so that each said grain boundary bisects each said ridge.

2. A photosensitive device in accordance with claim 1 which further includes electrical contacts intermediate said grain boundaries for providing electrical circuit connections for sensing voltages therebetween.

3. A photosensitive semiconductor device comprising an N-type semiconductive body with a layer of P-type semiconductor material diffused into a uniformly curved photosensitive surface containing a plurality of intersecting grain boundaries which extend from a first surface through said body to the surface of said diffused layer.

4. A radiation source position indicator which comprises a light sensitive semiconductor cell having a substantially planar top surface provided with ridges projecting outwardly therefrom, said cell having a plurality of intersecting grain boundaries terminating at the peaks of said ridges to separate areas on said ridges of said cell, said cell being effective to generate signals indicative of the angle of incidence of radiation falling on said surface, detecting means responsive to said signals for generating difference signals which indicate the angle of incidence of radiation falling on said cell, and means responsive to said detecting means for orienting said cell along at least two axes to position said surface perpendicular to said light beam in accordance with said difference signals.

5. A position indicator in accordance with claim 4 in which said ridges intersect at 120° angles at the center of said cell.

6. A position indicator in accordance with claim 4 in which said means for orienting includes first and second servo systems selectively responsive to said difference signals.

7. A radiation source position indicator which comprises a light sensitive semiconductor cell having a first surface, a plurality of ridges and a plurality of intersecting grain boundaries terminating at the peaks of said ridges, said ridge separating areas on said first surface of said cell, said cell being effective to generate signals indicative of the angle of incidence of light falling on said first surface, detecting means responsive to said signals for genearting difference signals which indicate the angle of incidence of said light with respect to said first surface, a first means responsive to said detecting means for orienting said cell in a first direction in accordance with said difference signals, and a second means responsive to said detecting means for orienting said cell in a second direction in accordance with said difference signals to position said cell with the light beam perpendicular to said first surface.

8. A photosensitive semiconductor device which comprises: a semiconductor body having a substantially planar top surface and at least one photosensitive grain boundary extending to said top surface thereof, said top surface having formed integral therewith a ridge bisected by each said grain boundary, said ridge projecting above said top surface for shielding said top surface on one side of said grain boundary from light directed from the other side of said grain boundary to provide angular sensitivity of said body with respect to the angle of said top surface relative to the direction of said light.

References Cited by the Examiner
UNITED STATES PATENTS

| | | | |
|---|---|---|---|
| 2,070,178 | 2/1937 | Pottenger et al. | 250—203 X |
| 2,669,635 | 2/1954 | Phann | 250—211 |
| 3,217,166 | 11/1965 | Weinreich | 317—235 |
| 3,229,102 | 1/1966 | Spencer et al. | 250—203 |

RALPH G. NILSON, *Primary Examiner.*

J. D. WALL, *Assistant Examiner.*